Nov. 25, 1941.  C. G. FLYGARE ET AL  2,264,160
GRINDING MACHINE
Filed Nov. 4, 1939  6 Sheets-Sheet 1

Inventor
CARL G. FLYGARE
JOHN I. GARSIDE
By Harold W. Eaton
Attorney

Inventor
CARL G. FLYGARE
JOHN I. GARSIDE
By Harold W. Eaton
Attorney

Patented Nov. 25, 1941

2,264,160

UNITED STATES PATENT OFFICE 2,264,160

GRINDING MACHINE

Carl G. Flygare, Worcester, and John I. Garside, West Boylston, Mass., assignors to Norton Company, Worcester, Mass., a corporation of Massachusetts Original application November 4, 1939, Serial No. 302,796. Divided and this application October 15, 1940, Serial No. 361,222

6 Claims. (Cl. 51—72)

The invention relates to grinding machines, and more particularly to a multiple wheel slide cylindrical type grinding machine in which the work to be ground is automatically loaded into the machine. This application is a division of our copending U. S. application Serial No. 302,796, filed November 4, 1939.

One object of the invention is to provide a simple, thoroughly practical cylindrical grinding machine in which work pieces are automatically loaded into and removed from the machine. Another object of the invention is to provide an automatically controlled cylindrical grinding machine with a work loading device whereby a work piece may be mechanically conveyed from an endless conveyor into an operating position in the machine.

A further object of the invention is to provide a hydraulically operated, manually controlled work conveyor mechanism to grip a work piece on a work conveyor adjacent to the machine and to convey it into an operative position into an automatic work loader for automatically loading the work piece into position on the machine. Another object of the invention is to provide a work supporting and rotating mechanism in which the work piece is automatically moved into operative engagement with the headstock center. Another object is to provide a grinding machine in which the work driving mechanism is controlled by the insertion of a work piece into the machine. A further object is to provide a work driving mechanism which rotates a work drive pin slowly until it seats in an operative position to rotate the work piece, after which the work piece is automatically speeded up to a normal grinding speed.

A further object of the invention is to provide an automatic work loading and unloading mechanism which is arranged to convey unground work pieces from an operating position on a transversely movable grinding machine steadyrest and to place an unground work piece on said steadyrest as it moves transversely toward an operative position. It is a further object of the invention to provide an electrical control mechanism for the various mechanisms of the machine which are so arranged and interlocked that the various mechanisms function automatically in the desired sequence.

A further object of the invention is to provide an automatically actuated table locating or traversing mechanism whereby the work supporting table is automatically adjusted longitudinally to position the work piece being ground in operative position with relation to the grinding wheel. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of the invention.

A grinding machine of the multiple wheel slide type has been illustrated in the drawings which follows the same general arrangement as that shown in the prior U. S. patent to Wood and Flygare No. 2,151,669, dated March 21, 1939, to which reference may be had for details of disclosure not contained herein.

A grinding machine has been illustrated, comprising a base 15 which supports a longitudinally movable work supporting table 16. The base 15 is provided with a flat way 17 and a V-way 18 which mate with correspondingly shaped ways on the table 16 to slidably support and guide the table 16 during its longitudinal movement thereon. The table 16 is provided with a rotatable work support which comprises a headstock 20 having a headstock center 21 and a footstock 22 having a footstock center 23. The headstock center 21 and the footstock center 23 are arranged rotatably to support the opposite ends of a work piece 19 during a grinding operation. The headstock 20 is preferably electrically driven by means of an electric motor 24 which is mounted on the upper surface of the headstock 20 and which is connected by a V-belt drive (not shown) contained within a casing 25. The belt drive from the motor 24 serves to drivingly rotate a headstock spindle 27 which in turn supports the headstock center 21.

The work supporting table 16 is arranged to be traversed longitudinally relative to the base 15 to facilitate positioning the work piece, such as a crankshaft 19, in a predetermined position for a grinding operation. In the preferred construction, the motor driven traversing mechanism is provided, comprising a reversible electric motor 30 which is mounted within the machine base 15 of the machine. The motor 30 is provided with an armature shaft 31 which supports a gear 32. The gear 32 meshes with a gear 33 which is mounted on the end of a rotatable shaft 34 which is journalled in bearings 35 and 36 formed in the casing 37. The shaft 34 has a worm 38 formed integral therewith which meshes with a worm gear 39. The worm gear 39 has a central threaded aperture which meshes with or engages a stationary non-rotatable screw 40. The screw 40 is supported at its opposite ends by means of a pair of spaced depending brackets 41 and 42. The worm gear 39 is free to rotate on the screw 40 but is held against endwise movement by thrust bearings (not shown) formed within the casing 37. It will be readily apparent from the foregoing disclosure that when the motor 30 is started, a rotary motion is transmitted through the gear 32, the gear 33, the shaft 34, the worm 38, to rotate the worm gear 39. The worm gear 39, being held against endwise movement relative to its supporting casing 37, produces an endwise movement of the screw 40 and transmits a corresponding endwise movement to the work supporting table 16. The motor 30 is a reversible type motor, consequently it can be rotated in either direction to produce a traversing movement of the table 16 either toward the left or toward the right, as desired.

*Table locating mechanism*

Figure 2:
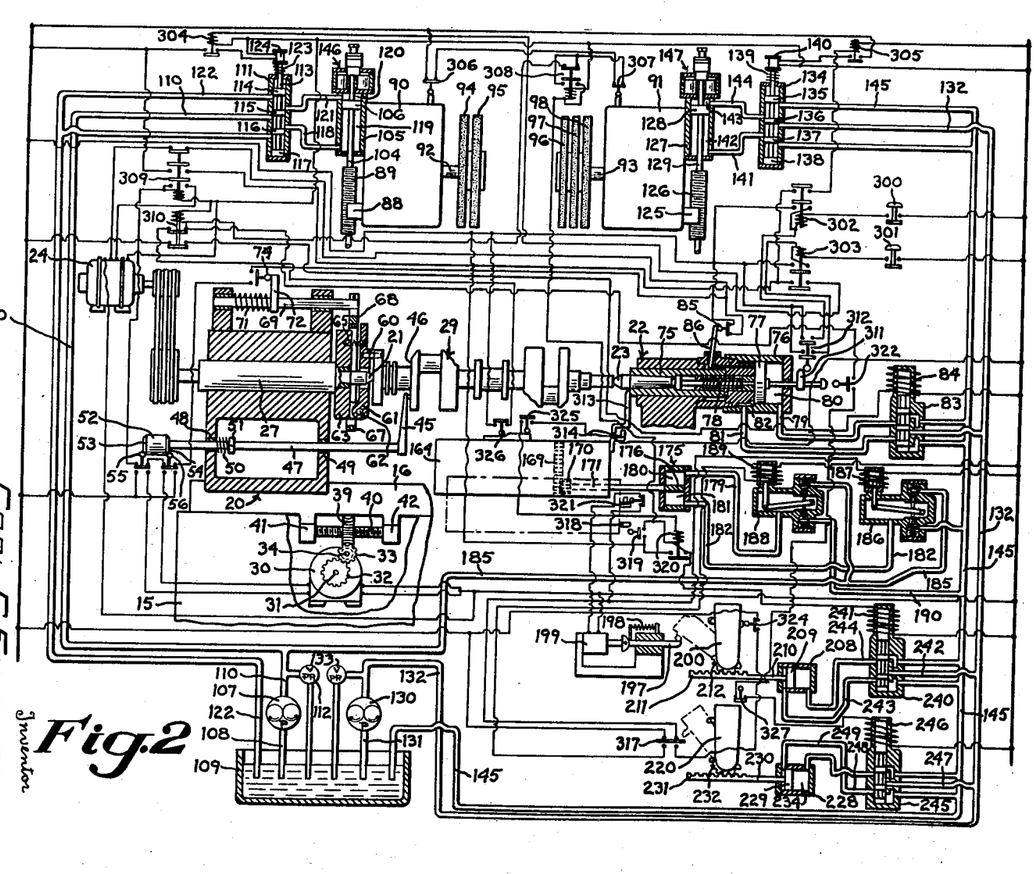
Fig. 2 is a diagrammatic view showing the hydraulic piping diagram and also the electrical wiring diagram of the machine.
Figure 4:
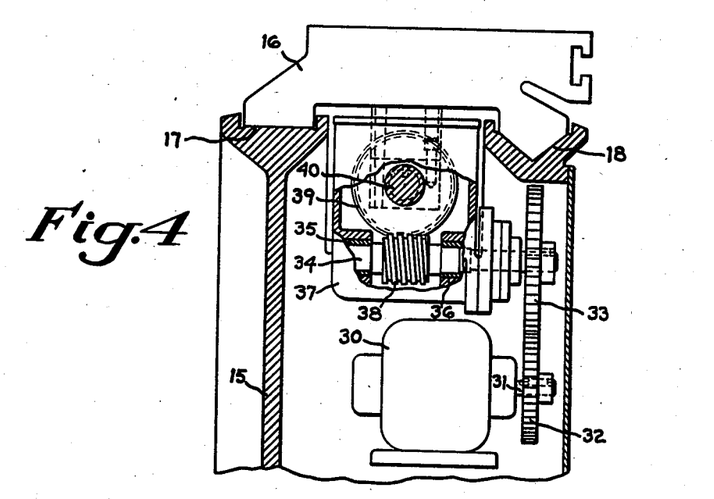
Fig. 4 is a fragmentary cross sectional view, on an enlarged scale, taken approximately on the line 4—4 of Fig. 1, showing the motor driven table traversing mechanism.
Figures 6, 7, 8:
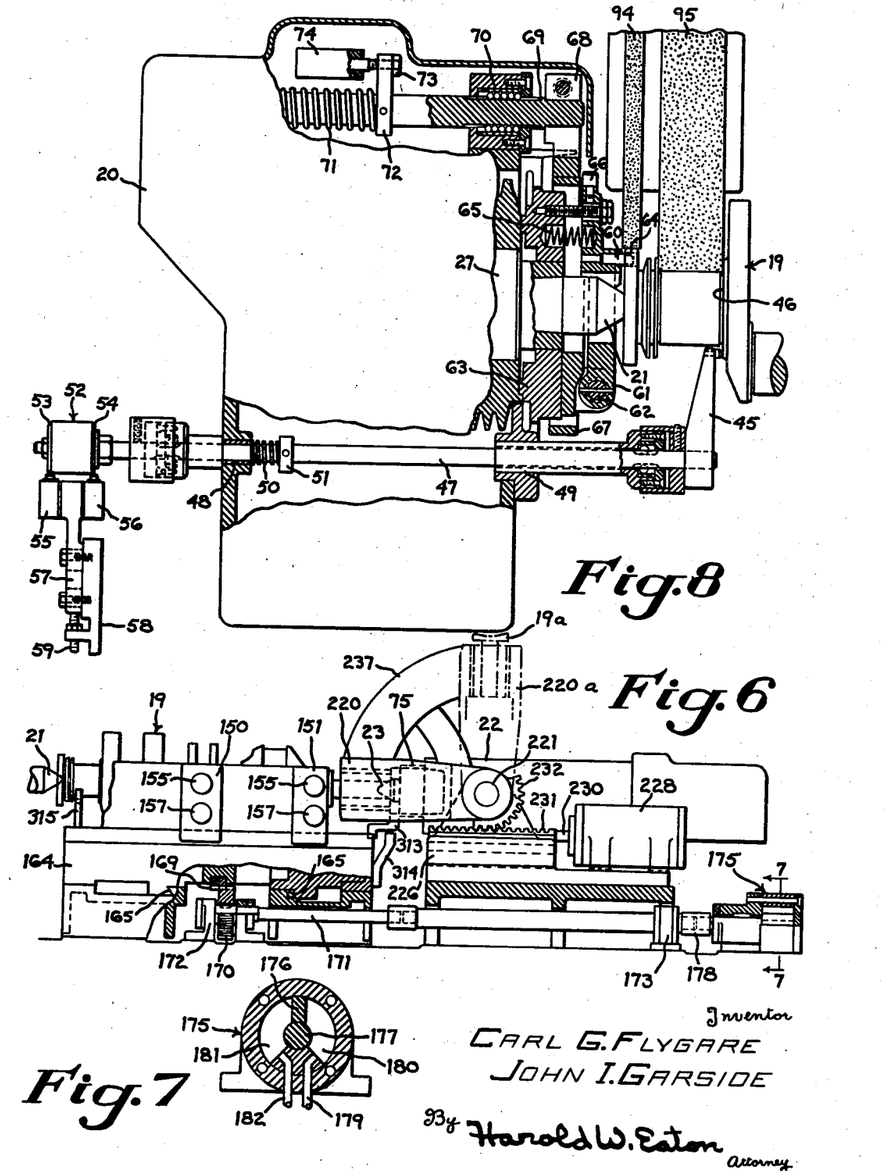
Fig. 6 is a fragmentary front elevation, on an enlarged scale, of the work steadying rest and work loading mechanism, as shown in Fig. 1, having parts broken away and shown in section to more clearly show the operating mechanism.
Fig. 7 is a cross sectional view, on an enlarged scale, taken approximately on the line 7—7 of Fig. 6, through the fluid motor for transversely moving the steadyrest unit.
Fig. 8 is a fragmentary plan view, on an enlarged scale, of the work driving and automatic table locating mechanism, having parts broken away and shown in section to more clearly show the operating construction.

The table 16 is preferably automatically adjusted to position successive work pieces in a desired and predetermined position relative to spaced portions thereon to be ground. An automatic table locating mechanism is provided, comprising a work engaging feeler arm 45 which is positioned to engage a locating surface 46 on the crankshaft 19. The feeler arm 45 is mounted on the end of a slidably mounted rod 47 which is supported in bearings 48 and 49 in the headstock 20. A spring 50, surrounding the rod 47 and interposed between a collar 51 on the rod 47 and an inner surface of the headstock frame, serves normally to move the rod 47 and the feeler arm 45 toward the right (Fig. 2). The rod 47 carries a member 52 on its outer end which is provided with cam faces 53 and 54 which are arranged to engage and actuate electric switches 55 and 56 automatically to close a circuit to cause a rotation of the motor 30 in either direction. Unless the locating surface 46 on the crankshaft 19 is located in the position shown in Fig. 2, one or the other of the switches 55 or 56 will be moved downwardly by the cam faces 53 or 54, respectively, to close either the forward or reverse circuit to start the motor 30 and to move the table 16 longitudinally. As soon as the table has been adjusted longitudinally a sufficient amount so that the feeler 45 moves into the position shown in Fig. 2, the member 52 returns the cams 53 and 54 to allow the switches 55 and 56 to return to their uppermost position, thus breaking the circuit to stop the table traverse motor 30 and table 16 when the work piece is located in a predetermined position with respect to the operative faces of the grinding wheel. In order to facilitate setting up the machine for a given work piece, the member 52 is preferably adjustably mounted on the rod 47, such as by means of opposed nuts (Fig. 8). The switches 55 and 56 are also preferably supported by means of a bracket 57. The bracket 57 is adjustably supported on a bracket 58 which is fixedly mounted relative to the headstock 20. An adjusting screw 59 is provided to facilitate transverse adjustment of the bracket 57. Clamping screws maintain the bracket 57 in fixed relation with the bracket 58. These clamping screws pass through elongated slots in the bracket 57 and are screw threaded into the bracket 58, thus serving to adjust the switches 55 and 56 transversely relative to their respective cam bases 53 and 54.

*Work drive*

The crankshaft 19 is loaded automatically into the machine in a manner to be hereinafter described, and is moved endwise into operative supporting engagement with the headstock center 21. A yieldably mounted driving pin 60 is supported on a pivotally mounted member 61 which is pivoted on a stud 62 carried by a face plate 63. The face plate 63 is supported on and rotated by the spindle 27. The pin 61 is arranged to engage a hole or aperture 64 in the end of the work piece and is normally held in driving engagement therewith by means of a spring 65. When the crankshaft 19 is placed in the machine and moved into supporting engagement with the center 21, the pin 60 engages the end face of the crankshaft unless it is aligned with the locating hole or aperture 64. If the pin engages the end face of the work piece, the pin together with the pivotally mounted member 61 rocks in a counterclockwise direction (Fig. 8) and a stud 66 carried thereby engages the face of a ring-shaped member 67 and moves it toward the left (Fig. 8). The ring-shaped member 67 is carried by a bracket 68 which is supported on a longitudinally slidable rod 69 which is journalled in bearings 70 (only one of which has been shown in Fig. 8). The rod 69 is normally held in its right-hand position (Fig. 8) by means of a compression spring 71 which exerts a pressure on a bracket 72 which is fixedly pinned to the rod 69. The bracket 72 carries an adjustably positioned screw 73 which serves when moved toward the left (Fig. 8) to actuate a limit switch 74. The limit switch 74 is connected in a manner to be hereinafter described, so that when the work piece 19 is placed in operative position on the headstock center 21 the headstock motor 24 is started at a slow rate of speed until the driving pin 60 slides into engagement with the aperture in the end of the shaft 19, after which the speed of the motor is automatically increased or stepped up to a desired and predetermined work speed for a grinding operation.

Footstock

The footstock 22 is provided with a longitudinally movable spindle 75 which is provided at its outer end with a tapered aperture to receive the footstock center 23 so as to support the right-hand end of the crankshaft 19. The footstock spindle 75 is preferably moved to and from an operative position by means of a fluid pressure mechanism comprising a cylinder 76 having a piston 77 slidably mounted therein. A spring 78 interposed between the piston 77 and the footstock spindle 75 is arranged yieldably to maintain the footstock center 23 in operative engagement with the work piece 19 during the grinding operation. Fluid may be admitted through a pipe 79 into a cylinder chamber 80 to cause the piston 77 and the spindle 75 together with the footstock center 23 to move toward the left (Fig. 2) into an operative position, or if desired fluid under pressure may be admitted through a pipe 81, into a cylinder chamber 82, to cause the piston 77 and footstock center 23 to move to an inoperative position.

The admission of fluid under pressure to the footstock cylinder 76 is preferably controlled by means of a control valve 83 which is preferably a piston type control valve which is actuated by means of a solenoid 84. The solenoid 84 is electrically connected to be actuated in timed relation with the movements of the other parts of the machine, in a manner to be hereinafter described.

An electrical interlock is provided, including a normally open limit switch 85 which is actuated by a pivotally mounted lever 86 supported on the footstock 22. The lever 86 is actuated to close the switch 85 when the piston 77 is moved into an operative position with the center 23 engaging and supporting the work piece 19. The switch 85 is operatively connected to start the work drive motor 24 to rotate the headstock spindle 27 and the driving pin 60 carried thereby at a slow rate of speed until the driving pin engages the locating and driving hole in the end of the work piece 19, after which the work drive motor 24 is speeded up to rotate the work piece 19 at the normal predetermined grinding speed.

Wheel slide

In the grinding of long cylindrical type work pieces, such as spaced bearings on an automobile crankshaft, it is desirable to provide a plurality of spaced wheel slides in order that the machine may function more efficiently, thus eliminating the necessity of traversing the work table to position successive portions of the work relative to the grinding wheel. In the preferred construction, it is desirable to provide a grinding wheel assembly comprising a pair of spaced grinding wheel slides 90 and 91 which support rotatable wheel spindles 92 and 93, respectively. The wheel spindle 92 supports a pair of spaced grinding wheels 94 and 95. The wheel spindle 93 supports three spaced grinding wheels 96, 97 and 98 which are arranged to simultaneously grind the main bearings and adjacent portions at the opposite ends of the crankshaft 19. The wheel spindles 92 and 93 are preferably motor driven by means of electric motors 100 and 101, respectively, which are supported on the upper surface of the grinding wheel slides 90 and 91, respectively. Multiple V-belt drives are provided within the casings 102 and 103, respectively, for drivingly connecting the motors 100 and 101, respectively, with the wheel spindles 92 and 93, respectively, to impart a rotary motion to the wheels 94, 95, 96, 97 and 98.

Wheel feeding mechanism

A fluid pressure wheel feeding mechanism is provided to control the feeding movement and adjustment of the grinding wheel toward and from the work support. Independent feed controlling mechanisms are provided for each of the wheel slides 90 and 91, respectively, so that each wheel slide may be fed independent of the other. If desired, the two controlling mechanisms are arranged so that each of the grinding wheels and their supporting slides may be fed simultaneously into grinding contact with the work to be ground. The wheel slide 90 is provided with a depending half nut 88 which is diagrammatically shown as projecting from the side of the wheel slide (Fig. 2) and which meshes with a rotatable feed screw 89. The rotatable feed screw 89 is rotatably supported in bearings (not shown) in the base 15. The feed screw 89 may be rotated manually for adjusting the wheel slide 90 in setting up the machine by a manually operable feeding mechanism to be hereinafter described.

In order that the wheel slide 90 may be rapidly moved toward the work piece to grind the same by the plunge-cut method, the feed screw 89 is connected to a piston rod 104. A fluid pressure cylinder 105 is fixedly mounted relative to the base 15 and contains a slidably mounted piston 106 which is connected to or formed integral with the piston rod 104.

A fluid pressure system is provided for conveying fluid under pressure to operate the wheel feeding mechanism as well as the other mechanisms of the machine which will be hereinafter described. A motor driven fluid pressure pump 107 is arranged to pump fluid through a pipe 108 from a reservoir 109 preferably formed within the base 10, and to force fluid through a pipe 110 to a feed control valve 111 which is arranged to control the admission to and exhaust of fluid from the cylinder 105. A pressure relief valve 112 is connected in the pipe line 110 and serves to maintain the desired pressure within the operating system by allowing excess fluid under pressure to by-pass into the reservoir 109. The feed control valve 111 is a piston type valve comprising a valve stem 113 having formed integrally therewith valve pistons 114, 115, 116 and 117. In the position of the valve illustrated in Fig. 2, fluid under pressure enters the valve chamber located between the valve pistons 115 and 116 and passes through a pipe or passage 118 into a cylinder chamber 119 so as to move the piston 106 rearwardly. During the rearward movement of the piston 106, fluid in a cylinder chamber 120 exhausts through a pipe or passage 121, into a valve chamber located between the valve pistons 114 and 115, and passes out through a pipe 122 which exhausts into the reservoir 109. A spring 123 normally serves to maintain the valve stem 113 in the position illustrated in Fig. 2. A solenoid 124 is provided to shift the valve stem 113 upwardly (Fig. 2) to reverse the direction of flow of fluid to and from the feed cylinder 105. This solenoid 124 is interconnected with the other mechanisms of the machine so that it is energized in timed relation with the remainder of the grinding cycle automatically to feed the grinding wheels and their supporting slides toward the work piece at the desired time.

Similarly, the wheel slide 91 is provided with a depending half nut 125 which meshes with or engages a rotatable cross feed screw 126 which is in turn journalled in suitable bearings (not shown) in the base 15. The screw 126 may be rotated manually in the usual and well known manner to adjust the position of the wheels 96, 97 and 98, as desired. In the preferred form, however, a fluid pressure feeding and positioning mechanism is provided, comprising a fluid pressure cylinder 127 which is fixedly mounted on the base 15 of the machine. The cylinder 127 contains a slidably mounted piston 128 which is connected by means of a piston rod 129 with the feed screw 126, so that an endwise movement of the piston 128 and piston rod 129 will transmit a transverse movement to the wheel slide 91 and the grinding wheel supported thereby.

A motor driven fluid pressure pump 130 is mounted in the base of the machine and is arranged to pump fluid through a pipe 131 from the reservoir 109 and to force fluid under pressure through a pipe 132. An adjustable pressure relief valve 133 is connected in the pipe line 132 to facilitate maintaining the desired operating pressure within the system. Fluid under pressure passing through the pipe 132 is conveyed to a feed control valve 134 which is preferably a piston type control valve comprising a valve stem 135 having formed integrally therewith a plurality of valve pistons 135, 136, 137 and 138. A spring 139 normally holds the valve in the position illustrated in Fig. 2. An electric solenoid 140 is provided and is connected to be actuated automatically in timed relation with the cycle of the machine to shift the feed control valve 134 into its reverse position. Fluid under pressure passing through the pipe 132 enters a valve chamber located between the valve pistons 136 and 137 and passes through a pipe or passage 141 into a cylinder chamber 142 to cause a rearward movement of the piston 128 to move the wheel slide 91 and the grinding wheels 96, 97 and 98 supported thereby to an inoperative position. During this rearward movement of the slide, fluid within a cylinder chamber 143 is exhausted through a pipe or passage 144 which enters a valve chamber located between the valve pistons 135 and 136 and passes out through an exhaust pipe 145 which returns the exhaust fluid to the reservoir 109 within the base 15.

*Dash pot*

The pistons and cylinders for feeding the grinding wheels above described produce a rapid approaching or receding movement of the wheel slides 90 and 91 to quickly position the grinding wheels for a grinding operation and to remove them to an inoperative position after a grinding operation has been completed. In order to slow down the approaching movement of the grinding wheels to a slow but uniform feeding movement, a dash pot feed controlling mechanism 146 and 147 is provided adjacent to the rear ends of the cylinders 105 and 127, which serves to reduce the rapid approaching movement of the wheels to a relatively slow infeeding movement which continues until a positive stop prevents further advance of the wheel and allows the wheels to grind out or finish grind the work. The dash pot feed controlling mechanisms 146 and 147 have not been illustrated and described in detail in the present application, since these are not considered to be part of the present invention. These mechanisms are identical with that shown in the prior U. S. Patent to Wood and Flygare No. 2,151,669, above referred to, to which reference may be had for details of disclosure not contained herein.

*Steadyrests*

Figure 5:
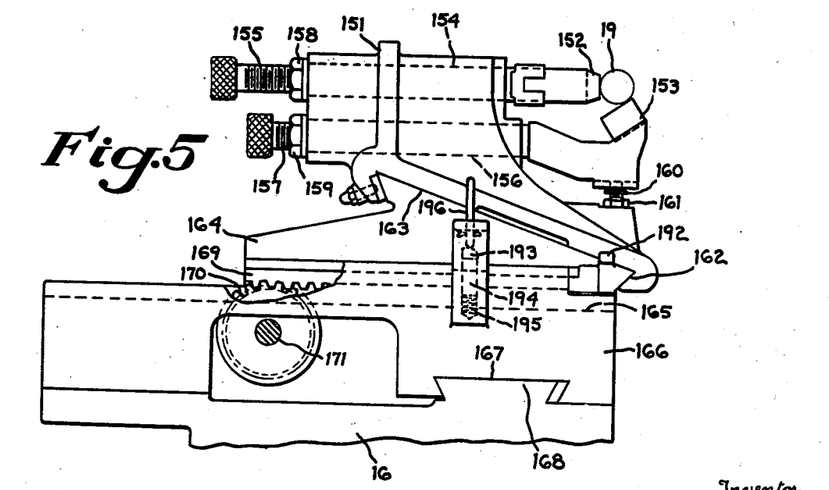
Fig. 5 is a fragmentary end elevation of the work steadyrest and its supporting slides.

In order to accurately grind the spaced portions of the crankshaft 19, it is essential to support the center of the shaft against deflection due to pressures of the grinding wheels. A pair of spaced steadyrests 150 and 151 are provided to engage spaced portions on the work piece 19. The steadyrests 150 and 151 are identical in construction, consequently only one of these steadyrests has been illustrated in detail (Fig. 5). Each of the steadyrests is provided with a pair of work steadying shoes 152 and 153. The shoe 152 is carried by a horizontally movable member 154 which is adjustable toward and from the axis of the work piece 19 by means of a screw 155. Similarly, the lower steadyrest shoe 153 is supported on the end of a slidably mounted member 156 which is arranged for adjustment by means of an adjusting screw 157. Lock nuts 158 and 159, respectively, are provided to lock the screws 155 and 157 in adjusted position. An adjustably positioned screw 160 and nut 161 are provided to support the steadyrest shoe 153 at a point directly below the work axis. Each of the steadyrests 150 and 151 is provided with an under dovetailed shaped surface 162 which mates with a correspondingly shaped surface 163 on a transversely movable slide 164.

In order to load work pieces into alignment with the work centers, it is preferable to employ the work steadyrests for conveying the work piece from a loading position into alignment with the headstock and footstock centers. The steadyrest supporting slide 164 is, therefore, provided for movement in a transverse direction. The member 164 is provided with a dovetailed slideway 165 which mates with a dovetailed surface on the upper face of a longitudinally movable slide 166. The member 166 is provided on its under surface with a dovetailed slideway 167 which mates with a correspondingly shaped dovetailed surface 168 (Fig. 5) formed on the upper surface of the work table 16, thus providing a structure in which the two steadyrests 150 and 151 may be moved simultaneously in a transverse direction, that is, normal to the work axis to position a work piece in operative position within the machine, or may be moved longitudinally in a direction parallel to the work axis to complete the loading operation by positioning the work piece in operative engagement with the headstock center and the headstock driving pin.

The transversely movable slide 164 is provided with a depending rack bar 169 which meshes with a gear 170. The gear 170 is supported on one end of a rotatable shaft 171 which is journalled in suitable bearings 172 and 173 which are fixedly mounted on the upper surface of the table 16. To facilitate a transverse positioning movement of the steadyrests 150 and 151 together with their supporting slide 164, a fluid motor 175 is provided for rotating the shaft 171. The motor 175 is preferably a single vane type motor comprising a single vane 176 which is supported on a central rotary member 177 which is in turn connected by a coupling 178 with the shaft 171. When fluid under pressure is admitted through a pipe 179 into a motor chamber 180 (Fig. 7), it causes a counterclockwise movement of the vane 176 which rotates the shaft 171 and the gear 170 to transmit a transverse movement through the rack bar 169 to move the slide 164 and the steadyrests 150 and 151 to an inoperative or loading position. During this movement fluid within the motor chamber 181 is exhausted through a pipe 182. When it is desired to move an unground crankshaft into operative position for a grinding operation, fluid under pressure is admitted through the pipe 182 into the motor chamber 181 to produce a clockwise movement of the vane 176 to cause a transverse movement of the slide 164 and the steadyrests 150 and 151 toward the grinding wheels to position a crankshaft into alignment with the headstock center 21 and footstock center 23. Fluid under pressure is conveyed from the pump 107, through the pipe 110, and through a pipe 185 to a control valve 186. The control valve 186 is preferably a solenoid operated valve having an electric solenoid 187 to open and close the valve ports. In the position illustrated in Fig. 2, fluid entering the valve 186 passes out through the pipe 182, into the motor chamber 181, to cause a clockwise movement of the vane 176 (Fig. 7). During this movement fluid under pressure within the chamber 180 exhausts through pipe 179, through a control valve 188 which is actuated by a solenoid 198, and passes out through a pipe 190 into the exhaust pipe 145 which returns the fluid to the reservoir 109. The solenoids 187 and 189 are electrically connected with the other mechanisms of the machine so that the fluid motor 175 is operated in timed relation with the other parts of the machine to produce a desired operating cycle.

A mechanical latch device (Fig. 5) is provided to limit the forward movement of the slide 164 carrying the steadyrests 150 and 151 in a position aligned for loading a shaft 19 into the machine. This latching device comprises a fixed stop abutment 192 which is formed integral with or fixedly mounted on the end face of the transverse slide 164. The abutment 192 is arranged to engage a spring-pressed latch pin 193 when the slide 164 moves toward a loading position automatically to position the steadyrest shoes 152 and 153 to receive the shaft 19 when a loading arm 200 is swung into an operative position. The latch pin 193 projects from the upper end of a spring-pressed plunger 194 which is normally held in an upward position by means of a compression spring 195. The top of the latch pin 193 is angled off on its right-hand side face so that when the slide 164 moves toward the left (Fig. 5), the abutment 192 will force the latch pin 193 downwardly to allow the slide 164 to move to its extreme rearward position.

On the forward movement of the slide 164, the abutment 192 engages the left-hand end face of the latch pin 193 positively to stop the forward movement of the slide 164. The arm 200 then swings downwardly into a horizontal position to place the crankshaft 19 in position on the steadyrest shoes 152 and 153, respectively. During the downward movement of the loader arm 200, the arm 200 engages an upwardly projecting pin 196 which is moved downwardly as the loader arm approaches a horizontal position to trip the latch pin 93 and thereby allow the slide 164 to continue its forward movement to transfer the unground shaft 19 into operative position in alignment with the work supporting centers 21 and 23, respectively.

*Work loading and unloading apparatus*

To facilitate maximum production from the machine, an automatically actuated work loading and unloading apparatus is provided for removing a finish ground shaft from the steadyrest when in a rearward position and to place an unground shaft on said steadyrest when the slide 164 is moved transversely toward an operative position.

A work loading device has been provided comprising the pivotally mounted work loader arm 200 which is pivotally supported on a stud 201. The stud 201 is supported in bearings 202 and 203 formed in upwardly extending arms 204 and 205 formed integral with a bracket 206 which is rigidly fastened to the frame of the footstock 22. A crankshaft 19 is loaded into a substantially U-shaped clip 207 formed in the end of the loader 200. The loader arm 200 is normally held in a vertical position, in which position the crankshaft 19 is loaded therein.

Figure 9:
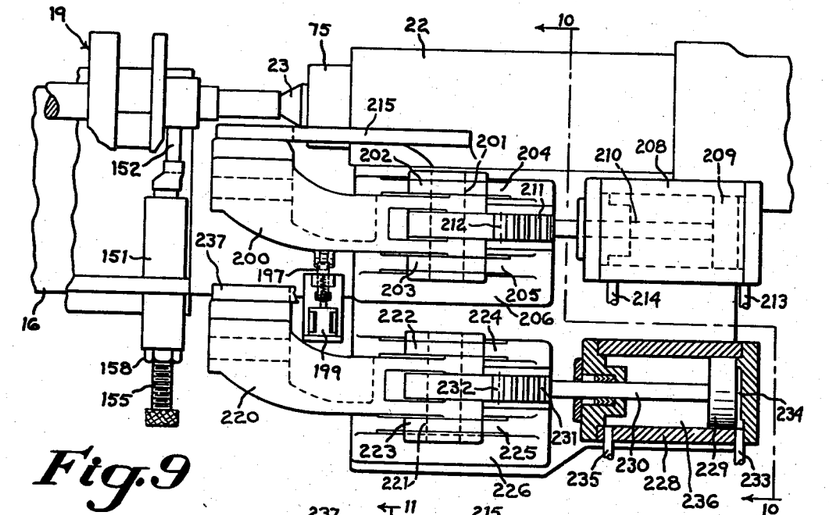
Fig. 9 is a fragmentary plan view, on an enlarged scale, of the steadyrest unit, the footstock, and the automatic work loading mechanism.
Figure 10:
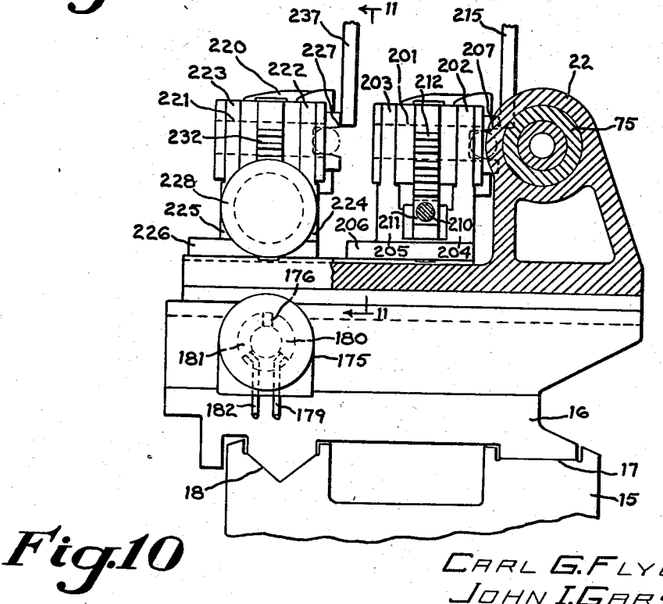
Fig. 10 is a fragmentary sectional view, taken approximately on the line 10—10 of Fig. 9.
Figure 11:
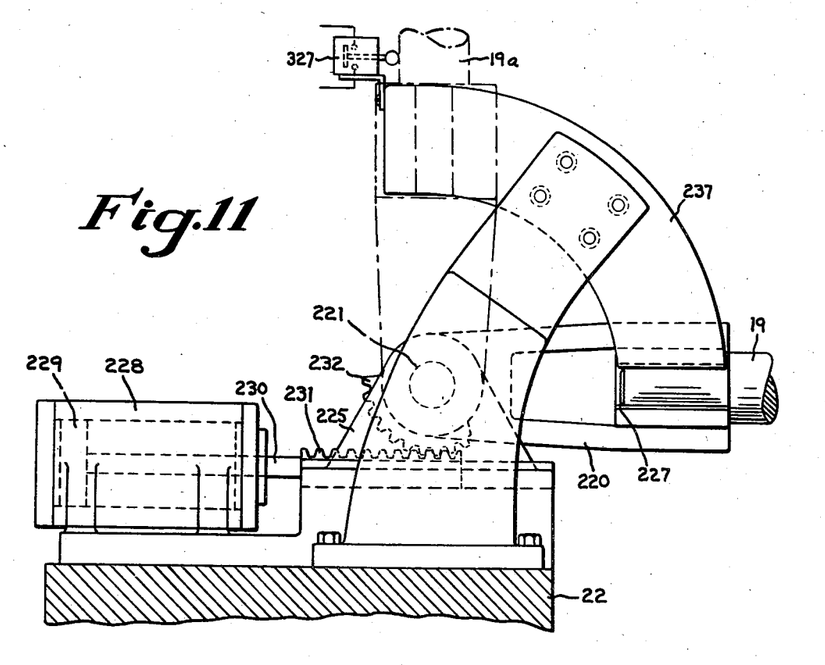
Fig. 11 is a fragmentary longitudinal sectional view, taken approximately on the line 11—11 of Fig. 10, showing the guard plate which closes the open side of the clip 227 during the transfer of a work piece.

A suitable actuating mechanism is provided automatically to swing the loader arm 200 from its normal vertical position into a horizontal position, such as that shown in Figs. 9 and 10, to place the unground crankshaft 19 in supporting engagement with the shoes of the steadyrests 150 and 151. In the preferred construction, a fluid pressure mechanism is provided comprising a fluid pressure cylinder 208 having a piston 209 slidably mounted therein. The piston 209 is connected to one end of a piston rod 210 which carries a rack bar 211 at its outer end. The rack bar 211 meshes with a gear segment 212 which is supported on the stud 201 and fixedly mounted relative to the arm 200. When fluid under pressure is admitted through a pipe 213 (Fig. 9) into a cylinder chamber formed at the right-hand end of the cylinder 208, the piston 209, the piston rod 210, and the rack bar 211 are moved toward the left (Fig. 9) which serves to rotate the gear segment to raise the loading arm 200 into its normally vertical position. Similarly, when fluid under pressure is admitted through a pipe 214 into the cylinder chamber formed at the lefthand end of the cylinder 208, the piston 209, the piston rod 210, and the rack bar 211 transmit a rotary movement to the gear segments 212 to swing the loader arm from its normally vertical position to the full line position shown in Fig. 9 to position a crankshaft to be ground in supporting engagement with the steadyrest shoes on the steadyrests 150 and 151. An arcuate shaped plate 215 is fixedly mounted on the footstock 22 and serves to cover the open side of the U-shaped clip 207 during the swinging movement of the arm 200 until it reaches its lower or horizontal position so as to aid in maintaining the shaft 19 in position during the loading operation.

A solenoid actuated latch 197 is normally held in the path of movement of the work loader arm 200 by means of a tension spring 198. A solenoid 199 is energized when the steadyrest cross slide 164 moves forward to a predetermined loading position to withdraw the latch 197 against the tension of the spring 198. The energization of the solenoid 199 is controlled by a limit switch which is actuated by the transverse movement of the cross slide 164.

A similar unloading or discharge mechanism is provided comprising an unloader arm 220 which is pivotally supported on a stud 221 which is supported in bearing members 222 and 223. The bearing members 222 and 223 are supported in arms 224 and 225 which are formed integral with a base plate or frame 226. The frame 226 is fixedly mounted on a projecting base plate of the footstock 22. The unloading arm 220 is provided with a substantially U-shaped clip 227 which is adapted to support the end of a ground crankshaft as the shaft is moved to an inoperative position by means of the transverse movement of the steadyrest 150 and 151 (above described). An actuating mechanism is provided, comprising a fluid pressure cylinder 228 having a piston 229 slidably mounted therein. The piston 229 is connected to one end of a piston rod 230 having a rack bar 231 formed integral with its outer end. The rack bar 231 meshes with a gear segment 232 which is supported on the stud 221 and is fixedly mounted to move the unloader arm 220. When fluid under pressure is admitted through the pipe 233 into a cylinder chamber 234 formed at the right-hand end of the cylinder 228 (Fig. 9), it causes a movement of the piston 229, the piston rod 230, and the rack bar 231 toward the left to rock the gear segment 232 and swing the unloader arm 220 from a horizontal to a vertical position so as to remove a ground crankshaft from position on the steadyrest. Similarly, when fluid under pressure is admitted through a pipe 235 into a cylinder chamber 236 formed at the left-hand end of the cylinder 228, the piston 229, the piston rod 230, and the rack bar 231 are moved toward the right into the position illustrated in Fig. 9 to rock the gear segment 232 and to swing the unloading arm 220 from a vertical into a horizontal position, as shown in Fig. 9.

When the unloader arm 220 is in a horizontal position, the U-shaped clip 227 is positioned in alignment with the end portion of a ground crankshaft 19, so that when the crankshaft 19 is moved transversely after the work centers have been withdrawn, it is moved into position with the end of the shaft in engagement with the clip 227. A guard plate 237 which is arcuate in shape serves to close the open side of the U-shaped clip 227 when the arm 220 stops its swinging movement toward a vertical position automatically to move the ground crankshaft 19 out of engagement with the steadyrest and into a position where it may be readily removed from the machine in a manner to be hereinafter described.

A control valve 240 is actuated by means of a solenoid 241 and serves to control the admission to and exhaust of fluid from the cylinder 208. Fluid under pressure from the pump 130 passes through the pipe 132 and through a pipe 242 into the valve 240 which is preferably a piston type valve. In the position of the valve (Fig. 2), fluid under pressure passes from the valve 240, through a pipe 243, into a cylinder chamber located at the right-hand end of the cylinder 208 (Fig. 2), to move the piston 209 toward the left to swing the work loading arm 200 into its normal or vertical position. The energization of the solenoid 241 is preferably controlled automatically in timed relation with the other mechanisms of the machine, so that the work loader is swung downwardly at the proper time in the cycle of operation. When the solenoid 241 is deenergized to allow the valve 240 to move downwardly (Fig. 2), fluid under pressure from the pipe 242 passes through a pipe 244 into a cylinder chamber at the left-hand end of the cylinder 208 to move the piston 209 toward the right and to transmit a corresponding movement to the rack bar 211 to swing the work loader arm 200 from a vertical toward a horizontal position.

A control valve 245 which is actuated by means of a solenoid 246 is provided to control the admission of fluid to and the exhaust of fluid from the cylinder 228. Fluid under pressure from the pipe 132 passes through a pipe 247 and in the position illustrated in Fig. 2, passes out through a pipe 248 into the cylinder chamber at the right-hand end of the cylinder 228 (Fig. 2) to move the piston 229 and rack bar 231 toward the left so as to swing the work unloading arm 220 into its vertical position. Similarly, when the solenoid 246 is deenergized, fluid under pressure from the valve 245 passes through a pipe 249 into a cylinder chamber at the left-hand end of the cylinder 228 to move the piston 229 and the rack bar 231 toward the right (Fig. 2) to swing the work unloading arm 220 in a counterclockwise direction from a vertical toward a horizontal position so as to align the U-shaped clip 227 (Fig. 10) in position to receive the end of the ground crankshaft 19 when it is moved transversely from the work supporting center.

*Work conveyor*

Figures 1, 3:
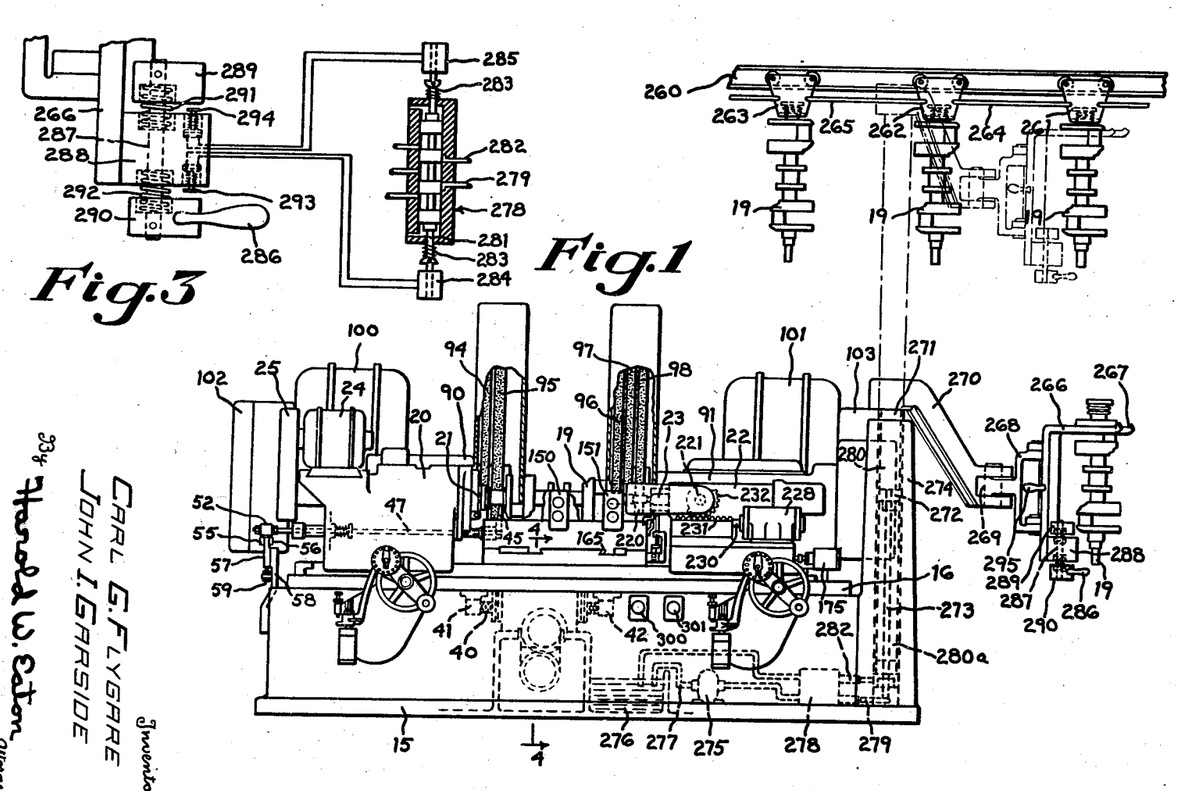
Fig. 1 is a front elevation of a grinding machine, showing the work loading mechanism.
Fig. 3 is a fragmentary elevation and diagrammatic view, on an enlarged scale, of the control lever and switch together with the solenoid valve for controlling the work transferring mechanism.

In the large automative plants, endless conveyors are provided to convey work pieces to the various machines. The work pieces are then removed from the conveyor manually and placed in the machine for a grinding operation, after which they are removed from and again placed on the conveyor to be conveyed to other machines for different operations. The lifting of heavy work pieces from the conveyor into the machine and vice versa is fatiguing upon the operator; consequently to attain one object of the invention, a manually controlled mechanical transferring mechanism is provided for transferring an unground work piece into the work loading device and returning it to the conveyor after a grinding operation has been completed. An endless conveyor track 260 (Fig. 1) is provided with an endless conveyor comprising a plurality of roller-supported work carrier members 261, 262 and 263 which are interconnected by links 264, 265. The carrier members 261, 262 and 263 serve to support a plurality of crankshafts 19 in a position adjacent to the grinding machine.

A work transfer member 266 is provided with a yoke-shaped end 267 which is arranged to engage and remove a crankshaft 19 from one of the work carriers 261, 262 or 263. The transfer member 266 is supported on a pivotally mounted frame 268 which is in turn supported by means of a vertically arranged stud 269 on the end of a lift arm 270. The arm 270 is fixedly supported at the upper end of a vertically movable fluid pressure cylinder 271. A piston 272 is slidably mounted within the cylinder 271 and is connected through the upper end of a hollow piston rod 273, the lower end of which is anchored to the base of the machine. The cylinder 271 is arranged to slide vertically in a central aperture formed within the column 274. A motor driven fluid pressure pump 275 within the base 15 of the machine conveys fluid from a reservoir 276 through a pipe 277 to a solenoid actuated control valve 278 which serves to admit fluid under pressure through a pipe 279, the hollow piston rod 273, into a cylinder chamber 280 formed above the piston 272 to move the cylinder 271 together with the arm 270 and the work transfer mechanism supported thereby in a vertical direction. During this movement, fluid within a cylinder chamber 280a located below the piston 272 is exhausted through a pipe 282 into the reservoir 276.

The solenoid actuated control valve 278 is a piston type valve (Fig. 3) comprising a valve stem 281 having formed integrally therewith a plurality of spaced valve pistons. A pair of balanced springs 283 normally serve to hold the valve 278 in a central or neutral position so that fluid is held within the cylinder chambers on both sides of the piston 272 to hold the work transfer stationary. A solenoid 284 serves when energized to move the valve stem 281 toward the right (Fig. 3) to pass fluid under pressure through the pipe 279 to raise the work transfer arm 270 when desired. A solenoid 285 serves when energized to move the valve stem 281 toward the left (Fig. 3) to pass fluid under pressure through the pipe 282 to lower the work transfer arm 270 when desired.

A manually operable control device is provided to facilitate both a swinging and lifting movement of the transfer member 266. A manually operable handle 286 is supported at the lower end of a vertically movable rod 287. The rod 287 is slidably supported in a bracket 288 which is carried by the transfer member 266. A block 289 is fixedly mounted on the upper end of the rod 287, and a block 290 is fixedly mounted on the lower end of the rod and serves to support the handle 286. A pair of balanced compression springs 291 and 292 serve to normally hold the handle 286 together with the rod 287 and the blocks 289 and 290 in the position illustrated in Fig. 3. An upward movement of the handle 286 serves to close a normally open switch 293 which is connected to energize the solenoid 284 to shift the valve stem 281 toward the right (Fig. 3) to admit fluid under pressure into the cylinder chamber 280 to cause an upward vertical movement of the cylinder 271 and the arm 270 together with the transfer member 266. Similarly, a downward movement of the handle 28 serves to close a normally open limit switch 294 which in turn serves to energize the solenoid 285 to shift the valve stem 281 toward the left (Fig. 3) to admit fluid under pressure into the lower cylinder chamber 280a to cause a downward movement of the cylinder 271, the arm 270, and the work transfer member 266. By bodily moving the handle 286 in a transverse direction, the arm 270 together with the cylinder 271 may be rotated about the axis of the cylinder as a pivot and the pivotally mounted frame 268 which supports the work transfer member 266 may be swung about the pivot 269.

It will be readily apparent from the foregoing disclosure that the operator, by manipulation of the handle 286, may raise the work transfer member 266 and at the same time swing it in a horizontal plane into position to grip a crankshaft supported on the work carrier of the endless conveyor and to swing it downwardly and laterally to transfer the unground work piece into position so that its lower end is supported by the substantially U-shaped clip 207 on the work loading arm 200. The handle 285 may then be moved to withdraw the work transfer member 266 and to swing it so that its yoke-shaped member 267 engages a ground shaft just removed from the machine which is supported in the U-shaped clip 227 formed in the end of the unloading arm 220. The handle 286 may then be manipulated to raise the cylinder 271 and swing the work transfer member 266 to again position the ground crankshaft on a vacant work carrier on the endless conveyor, by means of which the shaft is conveyed to other parts of the factory. An auxiliary handle 295 is provided on the work transfer member 266 to enable the operator to use both hands, if desired, the handle 295 serving to produce a transverse movement of the work transfer member 266, and the handle 286 serving to control the up and down movement thereof in the manner above described. It will be readily apparent, therefore that either one or both hands may be employed to readily swing the crankshaft from the endless conveyor into position on the loading arm and to remove the ground shaft from the unloading arm and readily transfer it again to the endless conveyor overhead without undue fatigue on the part of the operator.

The operation of the improved crankshaft grinding machine will be readily apparent from the foregoing disclosure. Assuming all of the parts to have been previously adjusted and a crankshaft has been placed in operative supporting engagement with the headstock center 21 and footstock center 23 and a grinding operation thereof has been completed, as soon as a grinding operation has been completed on a crankshaft 15, the push button switches 300 and 301 are actuated to break a circuit to deenergize the magnetic switches 302 and 303, respectively. The opening of the magnetic switches 302 and 303 serves to open magnetic switches 304 and 305, respectively, to deenergize the solenoids 124 and 140, respectively. The deenergizing of the solenoids 124 and 140 serves to release the compression of the springs 123 and 139, respectively, to shift the control valves 111 and 134, respectively, into the positions illustrated in Fig. 2 so as to admit fluid under pressure to move the pistons 106 and 128, respectively, in a rearward direction to remove the wheel slides 90 and 91 together with their respective grinding wheels 94, 95, 96, 97 and 98 to a rearward or inoperative position.

When the wheel slides 90 and 91 reach their rearward position, the limit switches 306 and 307 are automatically closed which serves to close circuits to energize the magnetic switches 309 and 310. The energization of the switch 310 serves to energize the solenoid 84 to move the footstock control valve 83 in an upward direction (Fig. 2) to admit fluid under pressure through the pipe 81 to the footstock cylinder chamber 82 to cause the piston 77 together with the spindle 75 and footstock center 23 to move toward the right (Fig. 2). This movement of the footstock to an inoperative position serves through the lever 86 to open the limit switch 85 which in turn stops the work drive motor 24. As the footstock piston 77 continues its movement toward an inoperative position, a lug 311 carried by an extension of the piston rod serves instantaneously to actuate a switch 312 to again energize the magnetic switches 302 and 303, respectively. This, however, has no effect on the mechanisms of the machine until the limit switch 85 is again closed by movement of the footstock parts into an operative position.

During the withdrawal of the footstock center to an inoperative position, a lug 313 which is fixedly mounted on the footstock spindle 75 engages a lug 314 projecting upwardly from the steadyrest supporting slide 164 to move the steadyrests 150 and 151 together with the silde 166 longitudinally toward the right (Fig. 2). This longitudinal movement of the steadyrests 150 and 151 moves the ground crankshaft 19 toward the right to withdraw it from engagement with the headstock center 21 and from engagement with the work drive pin 60 so that the ground crankshaft is supported on the steadyrest shoes 152 and 153 of the steadyrests 150 and 151 and the headstock end of the shaft 19 rests on a supporting bracket 315 the upper surface of which is shaped to engage and support the shaft during the first part of the unloading operation.

When the footstock center 23 reaches its right-hand or inoperative position (Fig. 2), a normally, open limit switch 322 is closed, which serves to close a circuit to energize the solenoid 246 to shift the valve 245 upward. The shifting of the valve 245 admits fluid under pressure through the pipe 249 into the cylinder chamber at the left of the piston 229 to swing the unloader arm 220 in a counterclockwise direction into a horizontal position to receive the ground crankshaft 19. During the downward movement of the unloader arm 220, a lug carried by the arm 220 actuates a switch 317 which serves to energize the solenoid 189 to shift the control valve 188 so as to admit fluid under pressure through the pipe 179 into the fluid motor chamber 180 of the fluid motor 175 to effect a rearward transverse movement of the steadyrest supporting slide 164. This movement of the slide 164 conveys a ground crankshaft 19 from a position in alignment with the headstock center 21 and footstock center 23 into a position where the end of the crankshaft engages the U-shaped clip 227 at the end of the unloader arm 220. The actuation of the switch 317 during the downward swinging movement of the unloader arm 220 serves to break a circuit to deenergize the solenoid 187 so that fluid exhausting from the fluid motor chamber 181 through the pipe 182 may exhaust out through the pipe 145 into the fluid reservoir 109 within the base 15 of the machine.

As the transversely movable slide 164 carrying the steadyrests 150 and 151, respectively, approaches its rearward or inoperative position, a lug 318 carried by the transverse slide 164 actuates a limit switch 319 to close a magnetic switch 320 which in turn closes a circuit to energize the solenoid 241 which shifts the loader control valve 240 in an upward direction (Fig. 2) to admit fluid under pressure through the pipe 244 into a cylinder chamber at the left-hand end of the piston 209 (Fig. 2) to move the piston 209 toward the right. This movement, through the rack bar 211 and the gear segment 212, swings the loader arm 200 in a counterclockwise direction (Fig. 2) until an abutment on the loader arm 200 engages the solenoid actuated latch plunger 197. The loader arm 200 has been previously loaded with a new unground crankshaft and the latch 197 holds the loader arm 200 together with the unground crankshaft supported thereby in position just clearing the steadyrests 150 and 151.

When the ground crankshaft 19 moves transversely into operative engagement with the clip 227 at the end of the unloader arm 220, the shaft 19 engages and actuates a limit switch 321 which serves to break the circuit to deenergize the solenoid 246 to allow the unloader control valve 245 to move into the position as shown in Fig. 2 to admit fluid under pressure through the pipe 248 to cause the unloader piston 229 to move toward the left so as to swing the unloader arm 220 together with the ground crankshaft to a vertical position. The swinging movement of the unloader arm 220 to a vertical position again actuates the switch 317 so as to deenergize the solenoid 189 to shift the valve 188 into the position as shown in Fig. 2 and at the same time to energize the solenoid 187 so as to admit fluid under pressure through the valve 186 and the pipe 182 into the fluid motor chamber 181 to initiate a forward movement of the transversely movable slide 164. The forward movement of the slide 164 together with the steadyrests 150 and 151 continues until the stop abutment 192 formed on the slide 164 engages the mechanically actuated latch pin 193 positively to limit the forward movement of the slide 164 in a loading position. At the same time the lug 192 stops the transverse movement of the slide 164, a limit switch 321 is closed to energize the solenoid 199 which serves to withdraw the latch 197 against the tension of the spring 198, thus releasing the loader arm 200 and allowing it to continue its movement in a counterclockwise direction (Fig. 2).

The unground crankshaft 19 is supported thereby in operative position in engagement with the steadyrest shoes 152 and 153 and also the bracket 315. As the loader arm swings into an operative position, the loader arm engages and moves downwardly the plunger 196 which serves to depress the mechanical latch pin 193 to move it out of the path of the stop lug 192, after which the fluid under pressure within the motor chamber 181 may continue the forward transverse movement of the slide 164 to position the unground crankshaft in alignment with the headstock center 21 and the footstock center 23. When the transversely movable slide 164 carrying the steadyrests 150 and 151 together with the work piece 19 reaches the forward or operative position, a limit switch 326 is opened to deenergize the magnetic switch 310 which in turn opens a circuit to deenergize the solenoid 84, thus shifting the footstock control valve 83 into the position illustrated in Fig. 2 to admit fluid under pressure through the pipe 79 into the cylinder chamber 80 to move the piston 77 together with the footstock spindle 75 and the center 23 toward the left (Fig. 2) into engagement with the footstock end of the crankshaft 19. The movement of the footstock continues and it in turn moves the crankshaft 19 together with the steadyrests 150 and 151 together with the longitudinally movable slide 166 toward the left so as to move the headstock end of the crankshaft into operative engagement with the headstock center 21. Movement of the footstock into an operative position closes the limit switch 85 which serves to start the headstock motor at a slow speed.

When the driving pin 60 rotates so that it drops into the driving aperture 64 (Fig. 8) in the end of the crankshaft, it closes the limit switch 74 which is connected in series with the limit switches 55 and 56 of the table locating device 52. If both of the switches 55 and 56 are closed, as determined by the work feeler arm 45, the magnetic switch 309 is closed to start the work drive motor 24 at the normal grinding speed for the work. If the work piece is not in a predetermined aligned position, either the switch 55 or 56 will be opened due to the movement of the cam 53 or 54, respectively, and the table positioning motor 30 will be rotated in one direction or the other to move the table 16 longitudinally so as to position the work piece 19 accurately in a predetermined location relative to the grinding wheel. After the work has been located, the magnetic switch 309 is then automatically closed. The closing of the switch 309 serves to energize the magnetic switches 304 and 305 through the magnetic switches 306 and 307 which in turn serve to energize the wheel feed solenoid 124 and 140, respectively, to move the valves 111 and 134 upwardly (Fig. 2) so as to admit fluid under pressure through the pipe 121 and 144, respectively, to cause a forward feeding movement of the wheel slides 90 and 91, respectively, to move the wheels 94, 95, 96, 97 and 98 into operative grinding contact with the portions of the work piece to be ground.

A limit switch 327 is mounted on the arcuate guard plate 237 and is arranged so that when the unloader arm 220 swings to a vertical position with a crankshaft supported therein, the crankshaft will open the switch 327 and maintain the circuit open so that the solenoid 246 cannot be energized or the unloader put through its next cycle until the finish ground crankshaft has been removed therefrom. The above cycle of operation is then continued to grind successive crankshafts.

Work pieces are conveyed from an overhead endless carrier to the loading arm by a manually controlled hydraulic mechanism, above described, which is controlled by the manually operable handles 286 and 295, respectively. The operator grasps the handle 286 (Fig. 1) and moves it upwardly which closes the switch 292 to actuate the solenoid 284 to shift the valve 278 toward the right (Fig. 3) so as to admit fluid under pressure to the cylinder chamber 280 to move the cylinder 271 together with the work conveying mechanism including arm 270 upwardly into dotted line position 270a. At the same time, the work carrier head 266 may be swung transversely into dotted line position 266a by movement of the handle 286 either utilized alone or in combination with the handle 295. The yoked portion 267 is swung into position 267a into engagement with a portion of the crankshaft 19 which is supported on the endless conveyor, to lift the shaft from the conveyor, after which the handle 286 is moved downwardly and the carrier 266 swung in a substantially horizontal direction to swing the end of the crankshaft 19 into alignment with the substantially U-shaped clip 207 on the loader arm 200, thus placing a new unground work piece in position on the loader arm for the next loading operation. The device may then be swung into position so that the yoke 267 will engage and pick up the ground shaft 19 in the unloader arm 220 and by manipulation of the handle 286 the ground shaft may be again reconveyed to the endless conveyor adjacent to the machine.

A normally open limit switch 324 is opened when the loader arm 200 is swung away from a vertical position to open a circuit and thereby render the solenoid 189 inoperative except when the loader arm 200 is in a vertical position. A normally closed limit switch 325 is opened when the slide 164 supporting the steadyrests 150 and 151 is in the forward or operative position and serves as a safety switch to maintain the solenoid 241 deenergized to hold the loader arm 200 in a vertical position. A normally closed limit switch 326 serves as a safety device to open the switch 310 when the steadyrest supporting slide is in a forward or operative position.

It will be readily apparent from the foregoing disclosure that the heavy crankshaft may be mechanically conveyed into an operative position on the loader and reconveyed from the unloader to the conveyor and automatically positioned in the machine and ground with the minimum attention on the part of the operator.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a grinding machine having a rotatable grinding wheel, a transversely movable slide therefor, a longitudinally movable table, a rotatable work support thereon including a headstock and a foot stock on said table, a rotatable headstock spindle and center, a yieldably mounted work driving pin associated therewith, a footstock center, a fluid motor to move said footstock center to and from an operative position, means including a motor to rotate the headstock spindle and driving pin, means including a switch actuated by movement of the footstock center to start rotation of the headstock spindle and driving pin at a slow speed, and means including a switch actuated by movement of said driving pin to increase the speed of rotation of the headstock spindle.

2. In a grinding machine having a rotatable grinding wheel, a transversely movable slide therefor, a longitudinally movable table, a rotatable work support thereon including a headstock and a footstock on said table, a rotatable headstock spindle and center, a yieldably mounted work driving pin which is rotatable with said spindle, a footstock center, means including a fluid motor to move said footstock center to and from an operative position to move a work piece into supporting engagement with said headstock center, means including an electric motor to rotate the headstock spindle and driving pin, means including a switch actuated by movement of the footstock center into an operative position to start the headstock motor slowly to rotate the headstock spindle and center, and means including a switch actuated by said yieldable driving pin when it moves into operative driving engagement with the work to speed up the headstock motor to rotate the headstock spindle at a normal grinding speed.

3. In a grinding machine having a rotatable grinding wheel, a transversely movable slide therefor, a longitudinally movable table, a rotatable work support thereon including a headstock and a footstock rotatably to support a work piece, means including a reversible electric motor to traverse said table longitudinally, and a table locating device including a movable work engaging feeler arm, a pair of spaced electric switches operatively connected to rotate said motor in either direction to transmit a corresponding movement to the table, and operative connections between said feeler and said switches to actuate one or the other of said switches so as to automatically move the table unless the work piece is in a predetermined position with relation to the grinding wheels.

4. In a grinding machine having a rotatable grinding wheel, a transversely movable slide therefor, a longitudinally movable table, a rotatable work support thereon including a headstock and a footstock rotatably to support a work piece, means including a reversible electric motor to traverse said table longitudinally, and a table locating device including a movable work engaging feeler, a pair of spaced electric switches, a cam operatively connected to move with said feeler, said cam being arranged to actuate either one or the other of said switches unless the work is in a predetermined position, and operative connections between said switches and said motor to rotate said motor in either direction to transmit a corresponding movement to the table.

5. In a grinding machine having a rotatable grinding wheel, a transversely movable slide therefor, a longitudinally movable table, a rotatable work support thereon including a headstock and a footstock rotatable to support a work piece, a rotatable headstock spindle and center and a yieldably mounted work driving pin associated therewith, means including an electric motor driven table positioning mechanism to move the table in either direction, said traversing mechanism including a reversible motor, a non-rotatable screw fixedly mounted on the under side of said table, a rotatable nut thereon, gearing connecting the nut with said motor, and an automatic locating device including a work engaging feeler and electric switches actuated thereby to start said reversible motor in either direction precisely to locate the table and work piece relative to the grinding wheel.

6. In a grinding machine having a rotatable grinding wheel, a transversely movable slide therefor, a longitudinally movable table, a rotatable work support thereon including a headstock and a footstock on said table, electrically motor driven mechanism to transverse said table in either direction to position a work piece in operative relation with the work piece supported thereon, a headstock spindle and center, a yieldably mounted work driving pin rotatable with said spindle and center, a footstock center, means including a fluid motor to move said footstock center, means including a motor to rotate the headstock spindle and driving pin, means including a switch actuated by movement of the footstock center to start the headstock motor to rotate the spindle at a slow speed, and a normally open switch which is closed by movement of the driving pin into operative driving relation with the work piece to actuate a table locating mechanism automatically to start the table driving motor to adjust the work table longitudinally to position a work piece unless the work piece is in a predetermined position relative to the operative face of the grinding wheel.

CARL G. FLYGARE.
JOHN I. GARSIDE.